United States Patent
Grunert

(10) Patent No.: US 9,022,228 B2
(45) Date of Patent: May 5, 2015

(54) DOMESTIC APPLIANCE FILTER, DOMESTIC APPLIANCE WITH SUCH A FILTER AND METHOD FOR MANUFACTURING SUCH A FILTER

(75) Inventor: Klaus Grunert, Berlin (DE)

(73) Assignee: BSH Bosch und Siemens Hausgeräte GmbH, München (DE)

( * ) Notice: Subject to any disclaimer, the term of this patent is extended or adjusted under 35 U.S.C. 154(b) by 1240 days.

(21) Appl. No.: 12/628,244

(22) Filed: Dec. 1, 2009

(65) Prior Publication Data

US 2010/0155326 A1 Jun. 24, 2010

(30) Foreign Application Priority Data

Dec. 22, 2008 (DE) .......................... 10 2008 055 093

(51) Int. Cl.
| | | |
|---|---|---|
| *B01D 39/10* | (2006.01) | |
| *D06F 58/22* | (2006.01) | |
| *B01D 47/00* | (2006.01) | |
| *B01D 39/12* | (2006.01) | |

(52) U.S. Cl.
CPC ............... *D06F 58/22* (2013.01); *B01D 47/00* (2013.01); *B01D 39/12* (2013.01); *B01D 39/10* (2013.01)

(58) Field of Classification Search
CPC ................................. B01D 39/10; B01D 39/12
See application file for complete search history.

(56) References Cited

U.S. PATENT DOCUMENTS

| | | | | |
|---|---|---|---|---|
| 1,921,309 | A  * | 8/1933 | Crammond et al. .......... | 210/508 |
| 4,669,199 | A  * | 6/1987 | Clawson et al. .................. | 34/82 |
| 6,153,689 | A | 11/2000 | Itoh et al. | |
| 6,662,464 | B2 * | 12/2003 | Treu .................................. | 34/85 |
| 2005/0166420 | A1* | 8/2005 | Slutsky et al. .................. | 34/312 |
| 2005/0252022 | A1 | 11/2005 | Tyau | |
| 2006/0027494 | A1* | 2/2006 | Choi ............................ | 210/508 |
| 2006/0147675 | A1 | 7/2006 | Nun et al. | |
| 2007/0095027 | A1* | 5/2007 | Liva ............................... | 55/301 |
| 2007/0251114 | A1* | 11/2007 | Kim ................................. | 34/82 |
| 2008/0276656 | A1* | 11/2008 | Kitamura et al. ............ | 68/12.13 |
| 2008/0317794 | A1* | 12/2008 | Gellermann et al. ......... | 424/401 |
| 2009/0255404 | A1* | 10/2009 | Ptak et al. ........................ | 96/11 |
| 2010/0058589 | A1* | 3/2010 | Mirtsch et al. ............. | 29/896.62 |

FOREIGN PATENT DOCUMENTS

| | | | |
|---|---|---|---|
| JP | 2006026913 A | * | 2/2006 |
| WO | 2008/077394 A2 | | 7/2008 |

OTHER PUBLICATIONS

Jul. 3, 2008, Mirtsch WO 2008/077394.*

* cited by examiner

*Primary Examiner* — Allison Fitzsimmons
(74) *Attorney, Agent, or Firm* — Jordan IP Law, LLC; Todd A. Vaughn

(57) ABSTRACT

A domestic appliance filter for use in a laundry treatment device includes a basic filter material with a hydrophobic coating for filtering out matter from a process water duct or a process air duct. The basic filter material includes a material which is resistant to temperatures of 160° C. or more and the hydrophobic coating on the basic filter material effects a surface energy of less than 35 mN/m.

19 Claims, 2 Drawing Sheets

DOMESTIC APPLIANCE FILTER, DOMESTIC APPLIANCE WITH SUCH A FILTER AND METHOD FOR MANUFACTURING SUCH A FILTER

BACKGROUND OF THE INVENTION

The invention relates to a domestic appliance filter, a domestic appliance with such a filter and a method for manufacturing such a filter.

Domestic appliances such as washing machines, tumble dryers, combined washer-dryers or dishwashers are generally known. The use of filters for cleaning a process medium in domestic appliances of this type is known. For instance a filter of this type is arranged in tumble dryers in a process air duct leading away from the drum housing. If laundry is dried in a drum within the drum housing, matter, in particular lint, is lead away from the laundry with the process air as the process medium and is carried along with the process air in the process air duct. To this end, the filter is used to filter such lint out of the process air so that the lint is unable to enter a condenser, a heating facility or a fan arranged downstream thereof. Filters of this type can typically be removed from outside the domestic appliance by way of an access and cleaned so as to remove lint adhering to the filter. Filters in a drainage outlet are known for instance in washing machines or dishwashers.

To ensure that the adhesive forces of the lint on the filter fabric of the filter are reduced, the filter fabric is advantageously provided with a hydrophobic coating. The lint filters usually used in tumble dryers consist of a plastic fabric, which is provided with a coating for the hydrophobic coating. At a temperature of approximately 160° C., the coating is fixed during a period of 1.5 minutes. This low temperature and the short fixing time are needed to prevent the plastic fabric from being damaged as a result of too significant a thermal effect since the plastic is also not durably resistant even at 160° C. The low temperature and short fixing time are disadvantageous in that the adhesive forces of foreign bodies on the filter fabric of the filter cannot be sufficiently reduced, thereby complicating the cleaning of the foreign bodies by means of a cleaning fluid.

US 2005/0252022 A1 describes an independent lint collector for collecting air particles, which includes an air inlet, in order to enable air particles to enter the lint collector, and a base which is disposed to increase the speed of the air particles and to limit the same as a result of a centrifugal force. The air inlet is connected to a dryer. The base can comprise a non-stick coating. The base can consist of aluminum. This lint collector is disadvantageous in that it takes up considerable storage space as a separate device. Furthermore, the lint collector only cleans the exhaust air from the dryer, in order also to be able to guide the exhaust air into an interior of a house. By contrast, cleaning of the process air in a dryer is not provided.

WO 2008/077394 A2 relates to a structured material web, in particular material web, for separating a fluid from solids with a multi-dimensional structuring, which comprises bulges or folds as well as structures arranged adjacent to one another and formed in each instance in a surface section enclosed by the bulges or folds, with each of the structures having an excellent location with a hole and the surface sections being formed in each other location of the structure at an incline toward the excellent location. The material web can be made from a meshed grid, a fabric or a textile. The material web can comprise a non-stick coating on its surface or a non-stick surface, in particular according to the Lotus effect. The material web can consist of a meshed grid or fabric and/or textile. The material web can consist of the following group of materials: metal, plastic, natural, carbon and glass fibers as well as cardboard and paper, a meshed grid, e.g. made of stainless steel or fabric. The material web can be used for a drum of a laundry treatment machine or also for a filter wall. The use of a lint filter in a process air circuit which can be cleaned with a liquid is not disclosed anywhere, neither is a tangible embodiment of a non-stick coating for this purpose. When using the material web, this is instead provided for the equal distribution or metering of fluid quantities in order to allow all liquid droplets, which could adhere to the material web and thus form fluid residues, to flow out.

EP 1 674 535 A1 relates to self-cleaning surfaces with improved mechanical stability and a method for the manufacture thereof. This aim is achieved in that self-cleaning, hydrophobically structured surfaces are manufactured, which have fixed mixtures of particles on their surface, the structure-specifying particles being selected from semi-metal or metal oxides, silicic acid and metallic powders and wax particles. Structured surfaces, which are structured by such a mixture of particles, are characterized by a considerably greater mechanical stability of the structure and are therefore particularly well suited to manufacturing self-cleaning surfaces which are exposed to greater mechanical stresses, like for instance the surfaces of tarpaulin, marquees, greenhouse elements, conservatories or HGV tarpaulins. The wax particles are nevertheless unsuited to use in lint filters since the wax particles would adulterate the comparatively fine meshes during application.

EP 0 825 230 A1 relates to an age-hardenable polymethyl silsesquioxane compound, which uses polymethyl silsesquioxane obtained from cost-effective precursors and provide a hard, scratch-resistant, highly corrosion-resistant, water-repellent and transparent hardened thin layer. The age-hardenable polymethyl silsesquioxane compound includes a polymethyl silsesquioxane with the general formula $(CH_3SiO3/2)n(CH_3Si(OH)O2/2)m$ and a predetermined molecular mass, MM, of 380 to 2.000, with m and n being positive numbers, which provide the predetermined MM, with the condition that the value of $m/(m+n)$ is lesser than/equal to $0.152/(MM \times 10-3)+0.10$ and greater than/equal to $0.034/(MM \times 10-3)$ and 10 to 250 proportion of weight of colloidal silica. These thin layers have been applied to planar carriers made of glass, aluminum or steel with a layer thickness of 6 μm and indicate a contact angle relative to water of approximately 120°.

US 2008/0276656 A relates to a drum-type washer-dryer which comprises a water tank, a rotatable drum, which is provided so as to be rotatable in the water tank, a dehumidification heat exchanger for dehumidifying air released from the interior of the drum, a heating unit for heating the air dehumidified by the dehumidification heat exchanger and a fan for introducing the air in the drum into the dehumidification heat exchanger and for transporting the air heated by the heating unit into the drum. A filter is arranged in a downstream duct between the drum and the fan and on an upstream side of the air flow, which is generated in a drying process by the fan. The filter is arranged such that it is saturated by water, which is introduced into the water tank during the washing or rinsing process. In one embodiment, the washer-dryer also has a cleaning unit for generating a flow of water and as a result removing foreign bodies which have adhered to the filter unit. Aside from metal wires, synthetic resin wires and suchlike are conceivable as wires which form the filter, nevertheless metal wires are preferred since metal wires have smooth surfaces and do not attract lint, thread sections and suchlike. Fixing the crossings of wire meshes, e.g. by means of synthetic resin coating of a cellular woven metallic yarn, prevents problems occurring such as changing the opening size of meshes which are caused by foreign bodies getting caught between the crossing wires, by displacing the crossings or such like. A hydrophobic coating is not disclosed, since the metal wires are already regarded as adequately smooth.

BRIEF SUMMARY OF THE INVENTION

It is an object of an exemplary embodiment of the present invention to provide a cost-effective and easily implementable possibility of more easily cleaning domestic appliance filters, in particular lint filters. In particular, the best possible framework conditions are to be created for a cleaning of a lint filter, which is used in the process air guide of a laundry drying appliance.

This object is achieved by means of a domestic appliance filter, a domestic appliance with such a filter and by means of a method for manufacturing such a filter according to the respective independent claim. Preferred embodiments can be inferred in particular from the dependent claims.

The domestic appliance filter comprises a basic filter material or a basic filter material with a hydrophobic coating for filtering out matter, in particular lint, from a process water duct or a process air duct, with the basic filter material consisting of material, which is resistant to temperatures of 160° C. or more. As a result, the coating time can be lengthened compared with a conventional plastic material, as a result of which the adhesive forces of foreign bodies on the filter material of the filter can already be reduced.

The basic filter material is preferably resistant to temperatures of more than 200° C., in particular resistant to temperatures of more than 300° C. The basic filter material can preferably be resistant here to high temperatures with a temperature influence lasting for more than 10, in particular more than 45 minutes, in particular 90 or more minutes. The high temperature-resistant material is particularly preferably resistant to temperatures of more than 200° C. with such a temperature influence lasting 90 or more minutes, in order to achieve a particularly suitable hydrophobic coating.

In particular, the basic filter material with the hydrophobic coating can be heat-treated for between 90 minutes and 120 minutes at a temperature in the range of 200° C. to 300° C.

The basic filter material preferably consists of or comprises metal. Metal filters can be manufactured and reworked in a simple and cost-effective manner. For use in a humid environment, like for instance in a tumble dryer or a washing machine, the basic filter material preferably consists of corrosion-resistant material, in particular of a material which is corrosion-resistant to washing liquor or the effects of water. Stainless steel or aluminum, which are temperature resistant and can be easily hydrophobically coated with suitable coating materials, are particularly advantageous as the basic filter material.

The hydrophobic coating on the basic filter material is preferably selected such that it effects a surface energy of less than 35 mN/m, in particular a surface energy of less than 28 mN/m. As a result, a particularly good prevention of an adhesion of lint, inter alia, to the filter is prevented. The hydrophobic coating is advantageously embodied with a thickness of 1 to 10 μm on the basic filter material, in particular with a thickness of 2 to 5 μm on the basic filter material. As a result, a molding of the basic filter material is not essentially prevented and the coating does not need to be taken into further consideration when designing the filter, thereby significantly simplifying manufacture. It is preferable if the hydrophobic coating is embodied as a nanolack and/or a lotus effect acting on the basic filter material. With the lotus effect, a contact angle relative to the water of approximately 160° or more is assumed. The nanolack can be easily applied to the basic material and effectively age-hardened. The nanolack may be embodied as a clear varnish for instance, which, in nanotechnology, has been mixed with ceramic particles. The basic filter material with the coating is preferably arranged as a fabric or structure.

For a simple and cost-effective manufacture, one possible embodiment shows the basic filter material having a non-structured surface, at least in respect of a wetting, in particular an un-worked structure.

The domestic appliance comprises a filter arranged therein with such an embodiment. The domestic appliance is embodied in particular as a laundry treatment device, like a tumble dryer, a washer-dryer or a washing machine, with the filter preferably being arranged as the lint filter in a process water duct or in a process air duct. The use of the lint filter in a combined process water and process air duct of a washer-dryer is not preferable here, since, the lint filter is too fine for an effective retention of lint from the process air for a process water flow and would block this and conversely a lint filter, which is optimized for a process water duct, is too rough to remove lint in a process air duct. The domestic appliance is however not restricted hereto and can be embodied as a vacuum cleaner, a dishwasher, a chimney stack etc. for instance.

The domestic appliance preferably comprises a filter cleaning apparatus for wetting the filter with a cleaning liquid, in particular water, for the cleaning thereof. The filter is in this case provided in particular as a lint filter in the process air duct for a tumble dryer or a washer-dryer. The filter cleaning apparatus allows the filter to be cleaned of adhering lint, with the lint cleaning apparatus rinsing or spraying cleaning fluid over the lint filter such that the adhering lint is rinsed off from a filter surface of the filter. In the case of an exemplary tumble dryer or washer-dryer, moisture taken from the laundry as a result of the drying process can be used as cleaning fluid, said moisture being condensed and collected for the cleaning process. Fresh water can however also be used as cleaning fluid.

With the method, the filter is manufactured from a basic filter material, which is provided with a hydrophobic coating, with a material which is durably temperature resistant to least 160° C. being used as the basic filter material.

A basic filter material is used as a material for the filter and/or the filter fabric instead of a plastic, which only enables the hydrophobic coating to be fixed at a low temperature of approximately 160° C. and short durations of approximately 1.5 minutes, said basic filter material enabling use with higher temperatures and/or longer duration of the high temperature influences. Metals, in particular stainless steel, but also other materials which satisfy these conditions, can be used particularly preferably. To provide a hydrophobic coating, metallic materials in particular enable burning temperatures and burning times, which are clearly above those of a simple plastic.

When burning so-called "easy-to-clean coats" on a stainless steel material for instance at temperatures between 200° C. and 300° C., preferably 250° C., surface energies can be generated with burning times between 90 and 100 minutes, said surface energies being clearly below those which can be reached on particularly simple plastic fabrics. Surface energies can be achieved in particular on stainless steel fabrics with values <28 mN/m, thereby significantly simplifying the cleaning of lint and/or matter from the filter.

A further advantage consists in an improved curing as a result of these temporal conditions and temperature conditions, as a result of which the resistance of the coating to temperature and humidity influences is further improved.

The use of stainless steel materials for lint filters allows the hydrophobic characters of the filter surface and the cleaning effect of a cleaning facility to be significantly improved.

BRIEF DESCRIPTION OF THE DRAWINGS

The invention is schematically described more accurately in the following figures with reference to an exemplary embodiment. For improved clarity, the same or functionally-identical elements are provided with the same reference characters here.

DETAILED DESCRIPTION OF EXEMPLARY EMBODIMENTS OF THE PRESENT INVENTION

Figure 1:
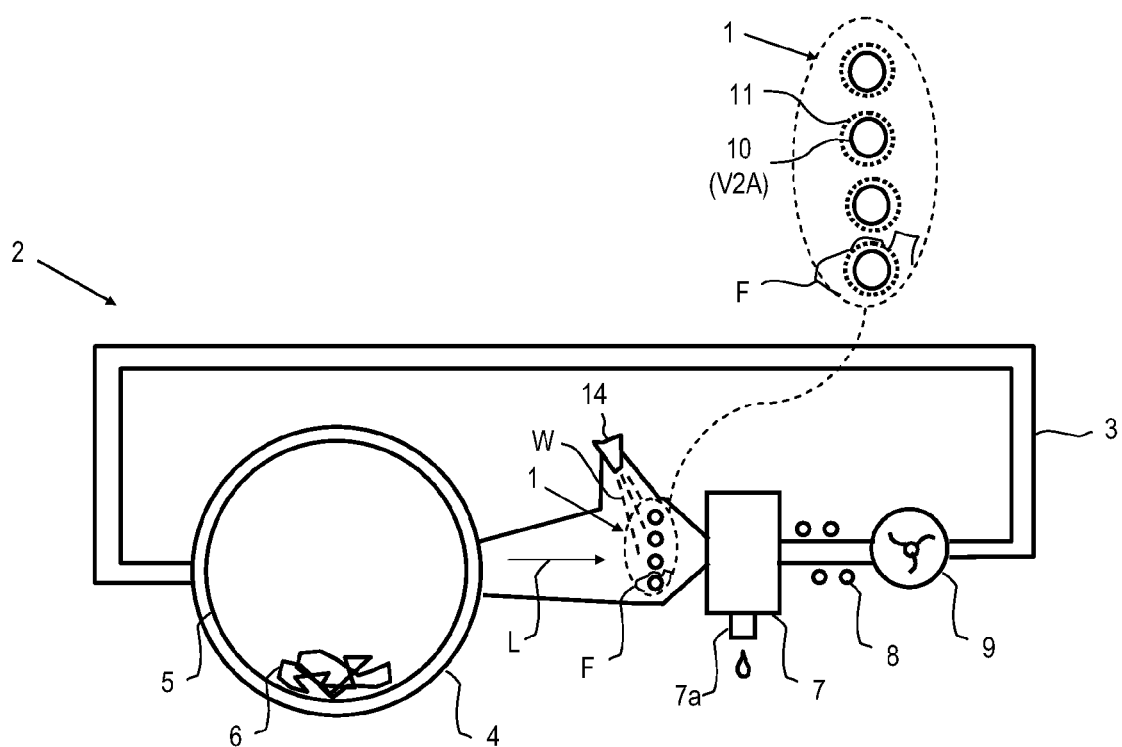
FIG. 1 shows a schematic representation of components of a tumble dryer with a lint filter, which comprises a preferred high temperature-resistant configuration

FIG. 1 shows an exemplary filter 1, which is used in a domestic appliance 2 in the form of a tumble dryer. The filter 1 is used here in a process air duct 3, which leads away from a drum 4. The drum 5 is used to dry laundry 6 introduced therein. When drying the laundry 6, in addition to moisture, this also emits matter F such as lint into the process air L. As shown, the matter F is filtered out of the process air L by the filter 1 and deposited there before the process air L reaches a condenser 7. The condenser 7 is used to condense the air humidity received by the process air L and to dissipate the same via a condenser outlet 7a. Lint F may deposit on the condenser 7 without the filter and as a result impair its efficiency. In a manner known per se, the moisture dissipated out of the condenser outlet 7 can be output into the ambient air, collected in a condensate container or dissipated by way of a drain of the domestic appliance 2. The process air L flowing through the condenser 7 is subsequently guided through a heating facility 8, for heating purposes. A fan 9 is also present in the process air duct 3, said fan guiding the heated process air back into the drum housing 4.

The tumble dryer 2 also comprises a filter cleaning apparatus 14 for wetting the filter 1 with a cleaning fluid, here: water W from the condensate container or fresh water, for the cleaning thereof. Only a spray head of the filter cleaning apparatus 14 is shown, by way of which spray head pressurized water is sprayed onto the filter 1. The more hydrophobic the surface of the filter 1, the easier lint etc. can be rinsed off from the filter and can be dissipated through a discharge line. The filter cleaning apparatus 14 is advantageous in that a user no longer needs to clean the filter 1 by hand.

Figure 2:
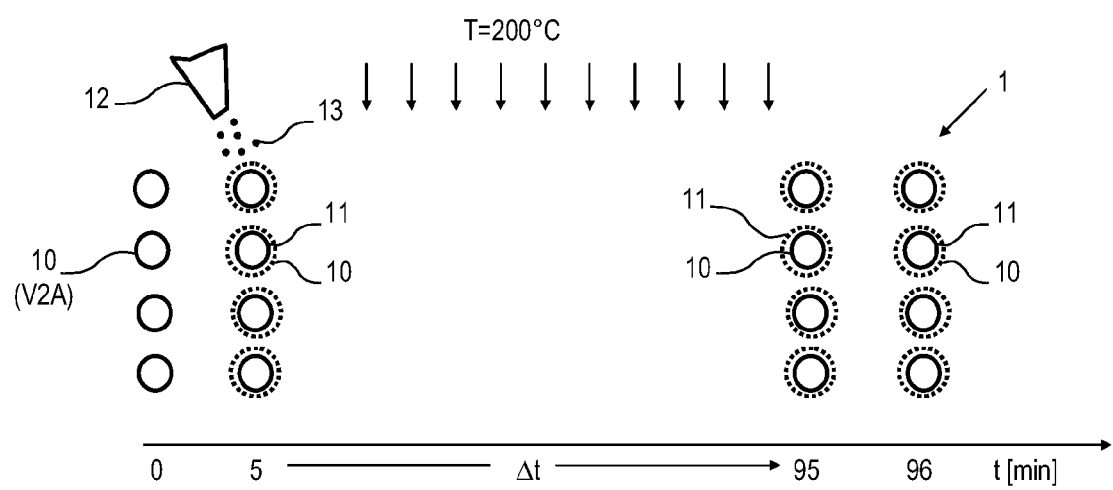
FIG. 2 shows a schematic representation of manufacturing steps for manufacturing such a filter.

As indicated on the basis of FIG. 1 and FIG. 2, the filter 1 as a lint filter consists of a meshwork, knitted fabric or structure made from a basic filter material 10, which is surrounded by a hydrophobic coating 11. A high temperature-resistant material, for instance stainless steel V2A, is preferred as the basic filter material 10.

FIG. 2 shows an exemplary sequence of manufacturing steps for such a filter 1. The manufacturing process begins at a first time instant of the continuously illustrated time t by providing the basic filter material 10. The basic filter material 10 is then coated by means of a coating apparatus 12 with coating material 13 for a hydrophobic coating 11. In this exemplary embodiment, the basic filter material 10 is provided with a coating 11 in the form of a nanolack, in which nanoceramic particles are mixed with a basic varnish material and harden after application on the filter basic material as a result of the temperature influence. Such nanolacks are particularly resistant not only to mechanical effects but also to cleaning means, which are used in washing for instance and are carried along with the process air or another process medium.

After in this case a period of five minutes, the basic filter material 10 thus prepared with the hydrophobic coating 11 is heated. A preferred temperature T amounts to 200° C. or more and acts on this arrangement for a period of time Δt of 90 minutes for instance. Subsequently, at a later point in time, the filter 1 completed in this way with the basic filter material 10 and the hydrophobic coating 11 surrounding the same with a thickness of 2 to 5 μm is removed and if necessary provided for a further processing in a domestic appliance.

The present invention is naturally not restricted to the exemplary embodiment shown.

A plurality of variations relating to the described embodiment and procedure for manufacturing such a filter 1 can thus be used. For instance, the temperature T can also be used in a lower or higher temperature range, depending on which material is used as the basic filter material 10. The same also applies to the time period Δt, during which the temperature T acts on the arrangement.

Finally, any material can be used, which is accordingly resistant to high temperatures and enables a coating with a suitable hydrophobic coating. In addition to metals, in particular corrosion-resistant metal such as stainless steel or aluminum, other types of materials with a non-metallic consistency or material mixture can also be used.

Instead of a spray head, the filter cleaning apparatus can also comprise a water discharge unit, by means of which water runs across the filter from above.

Advantageously, hydrophobic coatings can also be used, which offer the so-called lotus effect.

Aside from the use of such a filter in a tumble dryer as the domestic appliance, the use of such filters in other domestic appliances is also possible. For instance, such a filter can be used for instance in the process air duct of a washer-dryer as a combined washing machine with a tumble dryer or in a vacuum cleaner. The use of such a filter in a process medium duct, through which a liquid process medium is routed, like in a dishwasher or a washing machine and/or washer-dryer, is also possible.

The exemplary sequence of components in the tumble dryer as a domestic appliance can also take place in other sequence. In particular, such a filter not only needs to be arranged in the process air duct 3 directly behind the drum housing 4 but can instead also be arranged at any other point in the process air duct 3. The use of such a filter in another type of process air duct is also possible, for instance in an air supply duct or in an air removal duct, which lead to the exterior of the domestic appliance and are not embodied as a closed process air circuit.

What is claimed:

1. A domestic appliance filter for use in a laundry treatment device comprising:
    a basic filter material with a hydrophobic coating comprising a nanolack material composed of a clear varnish having ceramic nanoparticles, the basic filter material being provided at a process water duct or a process air duct of the laundry treatment device for filtering out matter therefrom, wherein the basic filter material comprises a material which is resistant to temperatures of between 200 and 300° C. and wherein the hydrophobic coating on the basic filter material effects a surface energy of less than 35 mN/m, wherein the hydrophobic coating effects a lotus effect on the basic filter material.

2. The filter of claim 1, wherein the surface energy is less than 28 mN/m.

3. The filter of claim 1, wherein the hydrophobic coating has a thickness of 1 to 10 μm.

4. The filter of claim 3, wherein the hydrophobic coating has a thickness of 2 to 5 μm.

5. The filter of claim 1, wherein the basic filter material is resistant to said temperatures with a temperature influence lasting at least 45 minutes.

6. The filter of claim 1, wherein the basic filter material is resistant to said temperatures with a temperature influence lasting at least 90 minutes.

7. The filter of claim 1, wherein the basic filter material comprises metal.

8. The filter of claim 7, wherein the basic filter material comprises a corrosion-resistant material.

9. The filter of claim 7, wherein the basic filter material comprises a material which is corrosion-resistant to washing liquor or the effects of water.

10. The filter of claim 7, wherein the basic filter material comprises stainless steel.

11. The filter of claim 7, wherein the basic filter material comprises aluminum.

12. The filter of claim 1, wherein the basic filter material comprises a fabric.

13. A domestic appliance, comprising:
a basic filter material with a hydrophobic coating composed of a clear varnish having ceramic nanoparticles, the basic filter material being provided at a process water duct or a process air duct of the domestic appliance for filtering out matter therefrom, wherein the basic filter material comprises a material which is resistant to temperatures of between 200 and 300° C. and wherein the hydrophobic coating on the basic filter material comprises a nanolack material and effects a surface energy of less than 35 mN/m.

14. The domestic appliance of claim 13, which is embodied as a laundry treatment device, in particular as a tumble dryer, washer-dryer or washing machine, wherein the filter is in a process air duct of the domestic appliance as a lint filter and that the domestic appliance also comprises a filter cleaning apparatus for wetting the filter with a cleaning fluid.

15. The appliance of claim 14, wherein the cleaning fluid comprises water.

16. A method for manufacturing a filter that includes a basic filter material with a hydrophobic coating comprising a nanolack material composed of a clear varnish having ceramic nanoparticles, the basic filter material being provided at a process water duct or a process air duct of the laundry treatment device for filtering out matter therefrom, wherein the basic filter material comprises a metal which is resistant to temperatures of between 200 and 300° C. and wherein the hydrophobic coating on the basic filter material effects a surface energy of less than 35 mN/m, the method comprising burning the hydrophobic coating onto the basic filter material for 90 minutes or more and at a burning temperature of between 200 and 300° C.

17. A domestic appliance comprising:
a filter provided at a process water duct or a process air duct of the domestic appliance, the filter including a filter material comprising a metal which is resistant to temperatures of between 200 and 300° C., and a hydrophobic coating provided on the filter material, the hydrophobic coating comprising a nanolack material composed of a clear varnish having ceramic nanoparticles, the hydrophobic coating having a thickness having a thickness of 2 to 5 μm and effects a surface energy of less than 35 mN/m; and
a filter cleaning apparatus configured to wet the filter with a cleaning fluid.

18. The domestic appliance filter of claim 17, wherein the filter material comprises stainless steel.

19. The domestic appliance filter of claim 17, wherein the filter material comprises aluminum.

* * * * *